United States Patent
Fischer et al.

(10) Patent No.: US 6,943,230 B2
(45) Date of Patent: Sep. 13, 2005

(54) METHOD FOR THICKENING AQUEOUS SYSTEMS USING HYDROPHILIC POLYURETHANES

(75) Inventors: Herbert Fischer, Duesseldorf (DE); Winfried Emmerling, Neuss (DE); Thomas Moeller, Duesseldorf (DE); Hermann Onusseit, Haan (DE); Werner Haller, Erkrath (DE); Bernhard Schoettmer, Duesseldorf (DE); Bernhard Herlfterkamp, Bottrop (DE); Dieter Feustel, Monheim (DE); Klaus Friedrich, Minden (DE); Hartmut Buesching, Raddestorf (DE); Norbert Huebner, Duesseldorf (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 10/155,510

(22) Filed: May 24, 2002

(65) Prior Publication Data

US 2003/0045668 A1 Mar. 6, 2003

Related U.S. Application Data

(62) Division of application No. 08/448,543, filed on Jul. 27, 1995, now Pat. No. 6,399,735, which is a division of application No. PCT/EP93/03526, filed on Dec. 14, 1993.

(30) Foreign Application Priority Data

Dec. 17, 1992 (DE) ..................... P 42 42 687

(51) Int. Cl.$^7$ ............................. C08G 18/48
(52) U.S. Cl. ................ 528/76; 524/591; 516/71
(58) Field of Search ................ 516/71; 528/76, 528/904, 905; 524/591; 525/403

(56) References Cited

U.S. PATENT DOCUMENTS

| | | |
|---|---|---|
| 2,948,691 A | 8/1960 | Windemuth et al. |
| 3,539,482 A | 11/1970 | Stewart |
| 3,660,010 A | 5/1972 | Georgoudis et al. |
| 4,155,892 A | 5/1979 | Emmons et al. |
| 4,496,708 A | 1/1985 | Dehm et al. |
| 6,399,735 B1 * | 6/2002 | Fischer et al. |

FOREIGN PATENT DOCUMENTS

| | | | |
|---|---|---|---|
| DE | 1127082 | * | 4/1962 |
| DE | 4137247 | | 5/1993 |
| EP | 0334032 | | 9/1989 |
| EP | 0497404 | | 8/1992 |
| EP | 0537900 | | 4/1993 |
| FR | 1279244 | | 11/1961 |
| GB | 1156784 | | 4/1969 |
| JP | 54001347 | | 1/1979 |

* cited by examiner

*Primary Examiner*—Rachel Gorr
(74) *Attorney, Agent, or Firm*—Stephen D. Harper

(57) ABSTRACT

A method for increasing an adhesive to a substrate is disclosed which utilizes a hydrophilic, high molecular weight, nonionic polyurethane adhesive. The polyurethane adhesive is soluble in water and a 1% by weight solution of the adhesive in water at 20% has a specific viscosity of at least 0.4. The nonionic polyurethane contains the following structural units:

a) $-O-(CH_2-CH_2O)_n-$ where n is 8 to 500;

b) $-CO-NH-X-NHCO-$ where X is an aliphatic or cycloaliphatic group; and c) $-O-Y-O-$ wherein Y comprises a hydrophobic moiety from the groups
$(-CH_2-CH(CH_3)-O)_m-CH_2-CH(CH_3)-$,
$(-CH_2\ CH(C_2H_5)-O)_m-CH_2-CH(C_2H_5)-$,
$(-CH_2-CH_2-CH_2-CH_2O)_m-CH_2CH_2CH_2CH_2-$, alkylene groups having from 2 to 44 carbon atoms, cycloalkylene groups having from 6 to 44 carbon atoms and mixtures thereof.

23 Claims, No Drawings

METHOD FOR THICKENING AQUEOUS SYSTEMS USING HYDROPHILIC POLYURETHANES

RELATED APPLICATIONS

This application is a divisional of U.S. application Ser. No. 08/448,543, filed Jul. 27, 1995 issued as U.S. Pat. No. 6,399,735 which is a 371 of PCT/EP93/03526, filed Dec. 14, 1993; claiming priority of German application number P4242687.1, filed Dec. 17, 1992: the entire contents of which are incorporated herein by reference.

BACKGROUND OF THE INVENTION

This invention relates to hydrophilic, high molecular weight nonionic polyurethanes, to their production and their use as the basis for an adhesive and as a stabilizer in emulsion polymerization.

RELATED ART

Hydrophilic polyurethanes are acquiring increasing significance in the form of aqueous dispersions. The dispersions may be stabilized by addition of emulsifiers or by the incorporation of hydrophilic groups. Typical hydrophilic groups are ionic groups, more particularly salts of carboxylic acids and alkali metals or amines. However, aqueous dispersions of polyurethanes with a nonionic internal emulsifier are also known.

Thus, EP 0 497 404 A describes an aqueous polyurethane dispersion based on tetramethyl xylene diisocyanate. The polyurethane contains as internal emulsifier a reaction product of alkoxypolyethylene glycol with an anhydride which is then further reacted with an alkylene oxide, an epoxy alcohol or a diglycidyl ether. According to Example 4, a) 133 parts by weight of a reaction product of methoxypolyethylene glycol and trimellitic anhydride, which finally was reacted with propylene oxide, b) 79 parts by weight of polypropylene glycol, c) 40 parts by weight of the ethylene glycol diether of bisphenol A and d) 146 parts by weight of isophorone diisocyanate are mixed and the resulting mixture is kept at 90° C. for 3 hours. This is followed by chain extension with water at 45 to 90° C. A dispersion containing particles 50 nm in size characterized by high resistance to water is obtained. This dispersion may be used for the production of adhesives and paints.

Aqueous polyurethane dispersions of the type in question have the disadvantage that, even with high solids concentrations, their viscosity is too low for many applications, for example as a wallpaper adhesive. In addition, the adhesive strength and tack of the correspondingly heavily diluted products are far too low or totally non-existent.

K. C. Frisch investigated the thermal and hydrolytic degradation of linear polyurethanes (Journal of Polymer Science, Vol. 11 (1973), pp. 637–648 and pp. 1683–1690). The polyurethanes were prepared from the diisocyanates toluene-2,4- and -2,6-diisocyanate (TDI), m- and p-xylene diisocyanate (XDI) and dicyclohexyl methane-4,4-diisocyanate (HMDI) and from polyoxyethylene glycol with an equivalent weight of 190, 1,485 and 2,955. In some cases, ethylene glycol was also used as chain-extending agent. Polyurethanes were prepared from these components in solvents at around 70° C. in the presence of tin octoate as catalyst. The hydrolysis was investigated using a solution of 0.75 g in 25 ml of solvent containing 10% by weight of isopropanol. The use of the polyurethanes thus produced was not discussed.

U.S. Pat. No. 4,079,028 describes a low molecular weight polyurethane as thickener for a latex and other aqueous systems. The polyurethane contains at least three hydrophobic groups with hydrophilic polyoxyalkylene groups in between. Thus, a polyurethane with an average molecular weight (Mw) of 71,000 terminated by dodecyl groups can be prepared, for example, from 200 g of polyethylene glycol, 1.7 g of dodecyl isocyanate and 1.4 g of TDI in toluene at 75° C. in the presence of dibutyl tin laurate. The molecular weight is in the range from 10,000 to 200,000. In the case of the linear polyurethanes (see Examples 1to 102), the degree of polymerization is generally 1 to 4 and at most 18. Table 19 contains reaction products of the three components diol, diisocyanate and a monofunctional compound, such as monoisocyanate or polyhydric alcohols or amines, as a clear limitation with respect to the known linear thickeners of the two components diol and monoisocyanate on the one hand and monoalcohol and diisocyanate on the other hand. Polyethylene glycol, diisocyanates and other polyols are not mentioned. The known linear polyurethanes are used as thickeners, for example even in adhesive dispersions. Their use as adhesives is not mentioned.

The same also applies to U.S. Pat. No. 4,155,892.

EP 0 537 900 describes corresponding polyurethanes as thickeners for non-aqueous systems.

DE 41 37 247 also describes a thickener of a linear polyurethane which is similarly prepared from a difunctional isocyanate, a polyether diol and a monohydric alcohol.

SUMMARY OF THE INVENTION

Accordingly, the problem addressed by the present invention was to provide an aqueous system of polyurethanes which have a high viscosity, even at low concentrations, which could compete in price with pastes and which could be mixed with water in any ratio.

The solution provided by the invention is defined in the claims. The invention is essentially based on the provision of a hydrophilic, high molecular weight nonionic polyurethane which is soluble in water and of which the viscosity in water may be additionally increased by hydrophobic interactions.

DETAILED DESCRIPTION OF THE INVENTION

By "water-soluble" and "high molecular weight" are meant the ability of the polyurethane to form a homogeneous mixture with water at 20° C. with a considerably higher viscosity than pure water. Thus, the specific viscosity of a 1% solution is at least 0.4, more particularly at least 0.5 and preferably at least 0.7, as measured with an Ostwald viscosimeter at 20° C. The dependence of the specific viscosity on concentration is substantially linear to the usual extent. The average molecular weight Mw is at least 10,000, preferably in the range from 20,000 to 200,000 and, more preferably, in the range from 40,000 to 180,000, as determined by GPC using polystyrene as the calibration standard.

The high molecular weight derives from the high viscosity. The specific viscosity may be up to 6.0, but is at least up to 4 (1% solution at 20° C., Ostwald viscosimeter). For polyurethanes containing polyethylene glycol as sole diol component, the melt viscosity at 175° C. is greater than 5, more particularly greater than 30 and, preferably, greater than 100 Pas (Epprecht). For polyurethanes containing additional hydrophobic diols, the melt viscosity is greater than 3, preferably greater than 5 and, more particularly, greater than 10 Pas at 175° C. Products which are virtually solid at 175° C. can also occur.

3 to 20% solutions have a viscosity at 22° C. of 20 mPa·s to firm (Brookfield, spindle 7). A 2% solution has a viscosity of 20 to 24,000 mPa·s (Brookfield, spindle 7). A 40% solution has a viscosity of 700 mPa·s to firm and, more particularly, 4,000 to firm (Brookfield, spindle 7).

It may be concluded from the viscosity behavior that the solution in question is a substantially true solution in which the polyurethane is molecularly dispersed in the water. More particularly, the polyurethane is miscible with water in any ratio at 20° C. Accordingly, there is no miscibility gap. It is at least possible to prepare an aqueous solution with a polymer content of up to 70% by weight, based on the solution. The aqueous solution is surprisingly stable not only as a function of time, but also on addition of ionic compounds or on addition of organic solvents. Thus, up to 5% of sodium chloride may be added. The aqueous solution even remains stable in the event of changes in the pH value. Thus, the pH value may be varied over the range from 2 to 12.

By "nonionic" is meant that the polyurethane does not contain any ionic groups as emulsifying groups, i.e. no carboxylate, sulfonate, phosphonate or ammonium groups. Its solubility in water is attributable instead to the hydrophilic nonionic groups of the polyethylene ether —[$CH_2$—$CH_2$—O—]$_n$— where n is a number of 8 to 500, more particularly 20 to 300 and, above all, 50 to 200. These structural units are derived in particular from the polyethylene glycols used as diols. However, polyethylene glycols in the context of the invention are not only polyaddition products of ethylene oxide with water or ethylene glycol as starter molecule, but also polyaddition products with other dihydric alcohols, for example butane diol, hexane diol, 4,4'-dihydroxydiphenyl propane. Several polyethylene glycols differing in their average molecular weight may also be used. Copolymers of ethylene oxide, for example with propylene oxide, may also be used providing they are sufficiently soluble in water, i.e. providing quantities of more than 10 g remain dissolved in 100 g of water over 6 months at 20° C.

Up to 50% by weight, preferably up to 40% by weight and, more particularly, up to 30% by weight of the polyethylene glycol may be replaced by other diols containing a hydrophobic residue with a solubility in water of at most 2 g/100 g water. The hydrophobic moiety Y is an aliphatic or alicyclic structure containing 2 to 44 carbon atoms and, more particularly, 6 to 36 carbon atoms. These moieties may even contain aromatic structures. The position of the two OH groups may have a certain significance, for example for the thickening and adhesive properties. Diols containing at least one primary OH group, more particularly 1,2- or alpha, omega-diols, are preferred, although diols with a vicinal position of the OH groups may also be used.

In addition, up to 40% of the polyethylene glycol may be replaced by other hydrophobic diols containing ether groups and having molecular weights in the range from 250 to 6,000, preferably in the range from 650 to 4,000 and more preferably in the range from 1,000 to 2,000. Specific examples of the hydrophobic diols and diols containing diether groups are polypropylene glycol (PPG), polybutylene glycol, polytetrahydrofuran, polybutadiene diol and alkane diols containing 4 to 44 carbon atoms. Preferred hydrophobic diols are polypropylene glycol, polytetrahydrofuran with a molecular weight of 400 to 3,000 and, more particularly, 1,000 to 2,000 and decane-1,10-diol, dodecane-1,12-diol, octadecane-1,12-diol, dimer fatty acid diol, octane-1,2-diol, dodecane-1,2-diol, hexadecane-1,2-diol, octadecane-1,2-diol, tetradecane-1,2-diol, 2-butene-1,4-diol, 2-butine-1,4-diol, 2,4,7,9-tetramethyl-5-decine-4,7-diol and ethoxylation products thereof, more particularly with up to 30 moles of EO, and finally monofatty acid esters of glycerol with fatty acids containing up to 22 carbon atoms, for example glycerol monoesters of behenic acid, oleic acid, stearic acid, myristic acid.

The hydrophobic diols are preferably used individually or in the form of mixtures in quantities of 2 to 30% by weight and, more particularly, 5 to 25% by weight, based on the total of diols used.

If a high molecular weight is to be obtained, the purity of the diols is of course an important factor. Thus, their content of alkali metal and alkaline earth metal ions should be below 500 ppm, more particularly below 150 ppm and preferably below 10 ppm. In addition, their water content should be below 0.5, more particularly below 0.1 and, preferably, below 0.05% by weight (as determined by the K. Fischer method).

The diols mentioned are all known and, for the most part, can also be commercially obtained on the chemicals market.

In addition to the diols, the diisocyanates are key structural elements of the polyurethane according to the invention. Diisocyanates are compounds with the general structure O═C═N—X—N═C═O, where X is an aliphatic, cycloaliphatic or aromatic radical, preferably an aliphatic or alicyclic radical containing 4 to 18 carbon atoms.

Examples of suitable isocyanates are, 1,5-naphthylene diisocyanate, 4,4'-diphenyl methane diisocyanate (MDI), hydrogenated MDI ($H^{12}$MDI), xylylene diisocyanate (XDI), tetramethyl xylylene diisocyanate (TMXDI), 4,4'-diphenyl dimethyl methane diisocyanate, di- and tetra-alkyl diphenyl methane diisocyanate, 4,4'-dibenzyl diisocyanate, 1,3-phenylene diisocyanate, 1,4-phenylene diisocyanate, the isomers of tolylene diisocyanate (TDI), 1-methyl-2,4-diisocyanatocyclohexane, 1,6-diisocyanato-2,2,4-trimethyl hexane, 1,6-diisocyanato-2,4,4-trimethyl hexane, 1-isocyanatomethyl-3-isocyanato-1,5,5-trimethyl cyclohexane (IPDI), chlorinated and brominated diisocyanates, phosphorus-containing diisocyanates, 4,4'-diisocyanatophenyl perfluoroethane, tetramethoxybutane-1,4-diisocyanate, butane-1,4-diisocyanate, hexane-1,6-diisocyanate (HDI), dicyclohexyl methane diisocyanate, cyclohexane-1,4-diisocyanate, ethylene diisocyanate, phthalic acid-bis-isocyanatoethyl ester, also diisocyanates containing reactive halogen atoms, such as 1-chloromethylphenyl-2,4-diisocyanate, 1-bromomethyl-phenyl-2,6-diisocyanate, 3,3-bis-chloromethylether-4,4'-diphenyl diisocyanate. Sulfur-containing polyisocyanates are obtained, for example, by reaction of 2 moles of hexamethylene diisocyanate with 1 mole of thiodiglycol or dihydroxydihexyl sulfide. Other important diisocyanates are trimethyl hexamethylene diisocyanate, 1,4-diisocyanato butane, 1,12-diisocyanatododecane and dimer fatty acid diisocyanate. Particularly suitable diisocyanates are tetramethylene, hexamethylene, undecane, dodecamethylene, 2,2,4-trimethyl hexane, 1,3-cyclohexane, 1,4-cyclohexane, 1,3- and 1,4-tetramethyl xylene, isophorone, 4,4-dicyclohexyl methane and lysine ester diisocyanate. Tetramethyl xylene diisocyanate (above all the m-TMXDI available from Cyanamid) is most particularly preferred.

The molar ratio of diol to diisocyanate should be in the vicinity of 1:1 in order to obtain a high molecular weight. The molar ratio is generally in the range from 1:0.95 to 1:1.25, preferably in the range from 1:0.95 to 1:1.12 and, more preferably, in the range from 1:0.98 to 1:1.1.

If emphasis is placed on a particularly high molecular weight, chain extension should be carried out in known manner by initially preparing prepolymers with excess diisocyanate and then extending the prepolymers thus formed with short-chain diols or diamines or with water. Specific examples of chain-extending agents are:

- the usual saturated and unsaturated glycols, such as ethylene glycol or condensates of ethylene glycol, butane-1,3-diol, butane-1,4-diol, butenediol, propane-1,2-diol, propane-1,3-diol, neopentyl glycol, hexanediol, bis-hydroxymethyl cyclohexane, dioxyethoxyhydroquinone, terephthalic acid-bis-glycol ester, succinic acid di-2-hydroxyethyl amide, succinic acid di-N-methyl-(2-hydroxyethyl)-amide, 1,4-di-(2-hydroxymethylmercapto)-2,3,5,6-tetra-chlorobenzene, 2-methylenepropane-1,3-diol, 2-methylpropane-1,3-diol;
- aliphatic, cycloaliphatic and aromatic diamines, such as ethylene diamine, hexamethylene diamine, 1,4-cyclohexylene diamine, piperazine, N-methyl propylene diamine, diaminodiphenyl sulfone, diaminodiphenyl ether, diaminodiphenyl dimethyl methane, 2,4-diamino-6-phenyl triazine, isophorone diamine, dimer fatty acid diamine, diaminodiphenyl methane or the isomers of phenylene diamine; also carbohydrazides or hydrazides of dicarboxylic acids;
- aminoalcohols, such as ethanolamine, propanolamine, butanolamine, N-methyl ethanolamine, N-methyl isopropanolamine; diethanolamine, triethanolamine and di- or tri-(alkanolamines);
- aliphatic, cycloaliphatic, aromatic and heterocyclic mono- and diaminocarboxylic acids, such as glycine, 1- and 2-alanine, 6-aminocaproic acid, 4-aminobutyric acid, the isomeric mono- and diaminobenzoic acids, the isomeric mono- and diaminonaphthoic acids.

The polyurethanes according to the invention may be prepared both by a single-stage process and by a two-stage process. In the two-stage process, a prepolymer is initially prepared by partly prereacting the polyols, for example the hydrophilic polyols, with the diisocyanate. The next polyol is then added.

However, the polyurethane according to the invention is preferably produced by a single-stage process. To this end, all the starting materials are initially mixed in the presence of an organic solvent with a water content of less than 0.5% by weight. The resulting mixture is then heated for about 1 to 30 hours to a temperature of 80 to 200° C., more particularly to a temperature of 100 to 180° C. and preferably to a temperature of 130 to 170° C. The reaction time can be shortened by the presence of catalysts. Particularly useful catalysts are tertiary amines, for example triethyl amine, dimethyl benzyl amine, bis-dimethyl aminoethyl ether and bis-methyl aminomethyl phenol. Particularly suitable catalysts are 1-methyl imidazole, 2-methyl-1-vinyl imidazole, 1-allyl imidazole, 1-phenyl imidazole, 1,2,4,5-tetramethyl imidazole, 1-(3-aminopropyl)-imidazole, pyrimidazole, 4-dimethylaminopyridine, 4-pyrrolidinopyridine, 4-morpholinopyridine, 4-methyl pyridine. However, the reaction is preferably carried out in the absence of a catalyst. The solvent also is best omitted. Solvents are understood to be inert organic liquids with a boiling point below 200° C. under normal pressure.

The polyurethanes according to the invention thus obtained are solid and crystalline at room temperature. The degree of crystallization varies within wide limits, depending on the starting materials and the crystallization conditions. It is generally between 20 and 80% and, more particularly, between 30 and 65%, based on the degree of crystallization of commercial relatively long-chain polyethylene glycol, particularly polyethylene glycol 6000 (as measured by DSC). The melting point is in the range from about 60 to 80° C.

The polyurethanes according to the invention are miscible with water in any ratio. A viscous solution is tacky on application to water-absorbent substrates. The dry bond can be redissolved by exposure to water or heat at around 60 to 80° C. An adhesive layer can be reactivated with water.

By virtue of these properties, the polyurethane according to the invention is suitable as a basis for the production of water-soluble hotmelt adhesives or remoistenable adhesives for paper, wall coverings and labels. A factor of considerable importance for this particular application is that the polyurethanes according to the invention are non-hygroscopic.

The polyurethane according to the invention is particularly suitable as a wallpaper adhesive, above all when Y in the hydrophobic moiety (component c) is an alkylene or cycloalkylene radical containing 2 to 44 carbon atoms, the attached radicals being in the 1,2- or alpha,omega-position and component c) making up 5 to 25% by weight, based on the sum of components a) and b) in the polyurethane. Even on its own, i.e. without any further additives, the polyurethane adhesive—in the form of a 0.5 to 10% by weight solution and, more particularly, in the form of a 1 to 5% by weight aqueous solution—forms an effective wallpaper adhesive with universal adhesion properties, for example on plastics, such as PVC, or on painted surfaces. Its adhesive strength is so high that even heavy wallpapers can be hung without difficulty. By virtue of its high and controllable resistance to water, it is particularly suitable for wallpapering in humid environments. The usual non-film-forming additives, such as for example emulsifiers, dyes and fragrances, may of course also be added. However, the polyurethanes according to the invention may also be mixed with other polymers from wallpaper adhesives without any adverse effect on their redispersibility. More particularly, cellulose ethers in conventional adhesive formulations may be completely or partly replaced. Similarly, the other film-forming components, i.e. for example starches and redispersible polymers, may be replaced. However, combination with all three of these classes of substances is of course also possible. The class of water-soluble cellulose ethers includes nonionic substances, such as methyl, methyl hydroxyethyl, methyl hydroxypropyl, hydroxypropyl and hydroxyethyl cellulose. Ionic water-soluble cellulose ethers include, for example, methyl/carboxymethyl cellulose and carboxymethyl cellulose. The class of water-soluble starch derivatives includes, for example, pre-gelatinized starch, carboxymethyl, hydroxypropyl and hydroxypropyl carboxymethyl starch. The class of polymers redispersible in water at room temperature includes, in particular, homopolymers and/or copolymers of vinyl esters with lower carboxylic acids containing 1 to 22 and, more particularly, 2 to 4 carbon atoms, such as for example vinyl acetate, vinyl propionate and viny laurate. Copolymers, particularly copolymers of vinyl acetate with the following comonomers, are also of importance: maleates, ethylene and vinyl chloride. However, homopolymers and copolymers of (meth)acrylates containing 1 to 4 carbon atoms in the alcohol component, for example styrene acrylates, may also be used.

The polyurethanes according to the invention may also be used with advantage in mineral binders, for example in tile adhesives. Polyurethanes in which X is a residue of n-tetramethyl xylene diisocyanate and Y is an alkylene or cycloalkylene group containing 2 to 44 carbon atoms with the radical carbon atoms in the 1,2- or alpha,omega-position, component c) making up from 5 to 25% by weight, based on the sum of a)+b) in the polyurethane, are particularly suitable for this purpose. Dodecane-1,12-diol or dimer diol is used in particular as the hydrophobic diol. A specific example of the composition of a tile adhesive is, for example, 35 parts by weight of Portland cement F-45, 62 parts by weight of silica sand F-36, 3 parts by weight of vinyl acetate copolymer and 69 parts by weight of a 4% aqueous solution of the polyurethane according to the invention in which X=TMXDI and Y=residues of dodecane-1,2-diol or dimer diol.

The polyurethanes according to the invention are also suitable for fixing carpets. They are distinguished by relatively high solubility in water and by prolonged displaceability of the carpet during laying.

The polyurethanes according to the invention are also suitable for stabilizing two-phase systems with water as the continuous phase, more particularly in suspension and emulsion polymerization. They are particularly suitable for use as a stabilizer in the emulsion polymerization of vinyl acetate and vinyl chloride either for the production of homopolymers or for the production of copolymers, such as ethylene/vinyl acetate copolymers. Their concentration is best in the range from 2.5 to 10 g/100 g of emulsion and, more particularly, in the range from 3 to 7 g/100 g.

The polyurethanes according to the invention are also suitable as thickening or swelling agents for aqueous systems because they increase viscosity to a considerable extent, even in low concentrations. It is remarkable that the thickening effect is barely affected by electrolytes and can be considerably enhanced by additions of nonionic surfactants. Polyurethanes, in which Y derives from polypropylene glycol, polytetrahydrofuran, dodecane-1,12-diol, octadecane-1,12-diol or dimer diol, are particularly suitable for this purpose. Component c) should be present in a quantity of 5 to 25% by weight, based on the sum of components a)+c) in the polymers. The preferred fields of application as a thickener are: adhesive dispersions, cosmetics, manual dishwashing detergents and systems in the mining/oil field industries.

The nonionic surfactants suitable for thickening may be added in quantities of 1 to 99% by weight, more particularly in quantities of 10 to 80% by weight and preferably in quantities of 30 to 70% by weight, based on the mixture of polyurethane and nonionic surfactant.

In the context of the invention, nonionic surfactants are understood to include:

1. Partial esters of polyalcohols: for example glycerol mono- or distearates and oleates, sorbitol monostearate and oleate.
2. Ethylene oxide or propylene oxide adducts: for example with fatty acids, fatty alcohols, fatty amines (these products may also have cationic properties), partial fatty acid esters of polyhydric alcohols, generally glycerol and sorbitol, alkylphenols, water (polyalkylene glycol).
3. Amides of higher fatty acids: for example stearic acid ethanolamide, general fatty acid amides.
4. Lecithins.
5. Steroids: for example cholesterol, dihydrocholesterol, hydroxycholesterol, phytosterols, zymosterol (Protegin, Eucerin, Amphocerin, Dehymuls, etc.).

Typical examples of nonionic surfactants are fatty alcohol polyglycol ethers, alkylphenol polyglycol ethers, fatty acid polyglycol esters, fatty acid amide polyglycol ethers, fatty amine polyglycol ethers, alkoxylated triglycerides, alk(en)yl oligoglycosides, fatty acid glucamides, polyol fatty acid esters, sugar esters, sorbitan esters and polysorbates. If the nonionic surfactants contain polyglycol ether chains, they may have a conventional homolog distribution, although they preferably a narrow homolog distribution. Ethoxylation products of fatty acids or fatty alcohols corresponding to the following general formula:

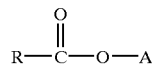

or

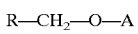

are particularly suitable. In these formulae, R is a linear or branched alkyl radical which may be saturated or unsaturated. R may be made up of 1 to 43 carbon atoms, preferably 6 to 23 carbon atoms, more particularly 8 to 23 carbon atoms and, most preferably, 12 to 23 carbon atoms. The ethoxylation products may even consist of mixtures of fatty acids or fatty alcohols with different alkyl radicals. A in the above formulae is a chain of 1 to 200, preferably 3 to 50 and, more particularly, 4 to 30 ethylene oxide units. In addition, up to 80 equivalents and preferably up to 50 equivalents of ethylene oxide units may be replaced by propylene oxide units. The terminal group of the alkylene oxide units may consist of a hydroxyl function. Alternatively, the O atom may even be etherified with alkyl, alkenyl or aralkyl groups.

The invention is illustrated by the following Examples:

EXAMPLES

A) Production and Properties of Water-soluble High Molecular Weight Polyurethanes

Example 1

In a 2 liter three-necked flask equipped with a stirrer and nitrogen inlet pipe, 1,500 g of Polywachs 6000 (polyethylene glycol Lipoxol, a product of Hüls; 0.5 equivalent) were freed from water for 1 h at 80° C. under a reduced pressure of 1 mbar. The flask was then purged with nitrogen, after which 67.2 g of m-TMXDI (Cyanamid; 0.55 equivalent) were added and the reaction mixture was stirred under nitrogen at 170° C. After 5 h, the NCO content was 0.06%. The reaction mixture was packed in containers while still hot. Melt viscosity: 61 Pa·s (175° C., Epprecht) Viscosity (40% aqueous solution): 17,000 mPa·s (spindle 7, Brookfield) Spec. viscosity (1% aqueous solution): 0.9 (Ostwald)

Example 1a

In a 1-liter three-necked flask equipped with a stirrer and nitrogen inlet pipe, 620 g of Polywachs 6000 (polyethylene glycol Lipoxol, a product of Hüls; 1 equivalent) were freed from water for 1 hour at 80° C. under a reduced pressure of 1 mbar. The flask was then purged with nitrogen, 26.4 g of m-TMXDI (Cyanamid; 1.08 equivalents) were added and the reaction mixture was homogenized. The mixture was then transferred to a tin can and heated at 145° C. After 2 h, the NCO content was 0.1%. The product was packed in containers while still hot. Melt viscosity: 105 Pa·s (175° C., Epprecht) Viscosity (40% aqueous solution): 33,000 mPa·s Spec. viscosity (1% aqueous solution): 1.1 (Ostwald).

Example 2

240 g of the Polywachs 6000 (0.08 equivalent) and 20 g of Voranol P 2000 (polypropylene glycol, a product of Dow;

0.2 equivalent) were freed from water as in Example 1 in a 500 ml flask. Addition of 12.46 g of m-TMXDI (0.102 equivalent). After 5 h, the NCO content was 0.08%. Melt viscosity: 25 Pa·s (175° C., Epprecht) Viscosity (40% aqueous solution): 300,000 mPa·s (Brookfield, spindle 7). Spec. viscosity (1% aqueous solution): 0.8 (Ostwald).

Example 3

450 g of Polywachs 6000 (0.15 equivalent) and 150 g of Voranol P 2000 (0.15 equivalent) were freed from water in a 1 liter flask as in Example 1. Addition of 37.4 g of m-TMXDI (0.306 equivalent). After 5 h, the NCO content was 0.12%. Melt viscosity: 6 to 8 Pa·s (175° C., Epprecht) Viscosity (40% aqueous solution): 600 mPa·s (Brookfield, spindle 7). Spec. viscosity (1% aqueous solution): 0.6 (Ostwald).

Example 4

240 g of Polywachs 6000 (0.08 equivalent) and 20 g of PTHF 2000 (polytetrahydrofuran, a product of BASF; 0.02 equivalent) were freed from water in a 500 ml flask as in Example 1. Addition of 12.46 g of m-TMXDI (0.102 equivalent). After 5 h, the NCO content was 0.06%. Melt viscosity: 21 Pa·s (175° C., Epprecht). Viscosity (20% aqueous solution): 8,000 mPa·s (Brookfield, spindle 7), spec. viscosity (1% aqueous solution): 0.85 (Ostwald).

Example 5

300.4 g of Polydiol 600 (polyethylene glycol, a product of Hüls; 0.88 equivalent) were freed from water in a 500 ml flask as in Example 1. Addition of 108.9 g of m-TMXDI (1.01 equivalent). After 5 hours, the NCO content was 0.14%. Melt viscosity: 0.4 Pa·s (175° C., Epprecht) Viscosity (100%): 600,000 mPa—s (Brookfield, spindle 7), spec. viscosity (1% aqueous solution, Ostwald): 0.2.

Example 6

233.80 g of Polywachs 12,000 (0.04 equivalent) were freed from water in a 500 ml flask as in Example 1. Addition of 5.1 g of m-TMXDI (0.042 equivalent). After 5 h, the NCO content was 0%. Melt viscosity: 20 Pa·s (175° C., Epprecht). Viscosity (40% aqueous solution): 4,600 mPa·s (Brookfield, spindle 7, spec. viscosity (1% aqueous solution, Ostwald): 1.7.

Example 7

300 g of Polywachs 6000 (0.1 equivalent) and 20.2 g of dodecane-1,12-diol (a product of Fluka; 0.2 equivalent) were freed from water in a 500 ml flask as in Example 1. Addition of 37.9 g of m-TMXDI (0.31 equivalent). After 5 hours the NCO content was 0.12%. Melt viscosity: 40 Pa·s (175° C., Epprecht). Viscosity (4% aqueous solution): 20,000 mPa·s (Brookfield, spindle 7), spec. viscosity (1% aqueous solution, Ostwald): 0.5.

Example 7a

The procedure was as in Example 7, except that the reaction temperature was 150° C. Viscosity (4% aqueous solution): 5,200 mPa·s (Brookfield, spindle 7).

Example 8

216 g of PW 6000 (pretreated with an ion exchanger—Lewatit SP 112, a product of Bayer AG; 0.073 equivalent) were freed from water in a 500 ml flask as in Example 1. Addition of 9.8 g m-TMXDI (0.08 equivalent). After 24 hours, the NCO content was 0.1%. Melt viscosity: 2.4 Pa·s (175° C., Epprecht). Viscosity (40% aqueous solution): 800 mPa·s (Brookfield, spindle 7), spec. viscosity (1% aqueous solution; Ostwald): 0.5.

Example 9

190.8 g of PW 6000 (pretreated with Tonsil standard; 0.071 equivalent) were freed from water in a 500 ml flask as in Example 1. Addition of 7.7 g of trimethyl hexamethylene diisocyanate (Hüls; 0.074 equivalent). After 4 hours, the NCO content was 0%. Melt viscosity: >64 Pa·s (175° C., Epprecht). Viscosity (20% aqueous solution): 3,000 mPa·s (Brookfield, spindle 7), spec. viscosity (1% aqueous solution; Ostwald): 2.2.

Example 10

300 g of PW 6000 (0.1 equivalent) and 18.35 g of hexadecane-1,2-diol (0.14 equivalent) were freed from water in a 500 ml flask as in Example 1. Addition of 30.55 g of m-TMXDI (0.25 equivalent). After 4 hours, the NCO content was 0%. Melt viscosity: 1 Pa·s (175° C., Epprecht). Viscosity (20% aqueous solution): 65,000 mPa·s (Brookfield, spindle 7), spec. viscosity (1% aqueous solution; Ostwald): 0.6.

Example 11

133.55 g of PW 6000 (pretreated with Tonsil standard: 0.05 equivalent) were freed from water in a 500 ml flask as in Example 1. Addition of 6.7 g of m-TMXDI (0.055 equivalent). After 6 hours, the NCO content was 0.2%. Addition of 0.7 g of diphenyl methane diamine (0.007 equivalent). After 1 hour, the NCO content was 0%. Melt viscosity: 56 Pa·s (175° C.; Epprecht). Viscosity (20% aqueous solution): 400 mPa·s (Brookfield, spindle 7), spec. viscosity (1% aqueous solution, ostwald): 1.1

Examples 12 and 13 are PEG/PPG Examples intended to demonstrate the solubility limit of PPG (Example 12 still soluble, Example 13 insoluble in water). Solubility limit ~60% PEG, 40% PPG.

Example 12

390 g of Polywachs 6000 (0.13 equivalent) and 220 g of Voranol P 2000 (0.22 equivalent) were freed from water in a 1 liter flask as in Example 1. Addition of 44.6 g of m-TMXDI (0.365 equivalent). After 5 hours, the NCO content was 0.2%. Melt viscosity: <1 Pa·s (175° C.; Epprecht). Viscosity (30% aqueous solution): 5,000 mPa·s (Brookfield, spindle 7), spec viscosity (1% aqueous solution; Ostwald): 0.4.

Example 13

150 g of Polywachs 6000 (0.05 equivalent) and 130 g of Voranol P 2000 (0.13 equivalent) were freed from water in a 500 ml flask as in Example 1. Addition of 22.85 g of m-TMXDI (0.187 equivalent). After 8 hours, the NCO content was 0.2%. Melt viscosity: <1 Pa·s (175° C.; Epprecht).

Example 14

(Incorporation of Dimerdiol)

300 g of Polywachs 6000 (0.1 equivalent) and 18.9 g of dimerdiol (0.07 equivalent) were freed from water in a 500 ml flask as in Example 1. Addition of 22.0 g of m-TMXDI (0.18 equivalent). After 5 hours, the NCO content was 0.094%. Melt viscosity: 32 Pa·s (175° C.; Epprecht). Viscosity (5% aqueous solution): 40,000 mPa·s (Brookfield, spindle 7), spec. viscosity (1% aqueous solution, Ostwald): 2.3.

Example 15

1,772 g of Polywachs 6000 (0.6 equivalent) and 137 g of octadecane-1,12-diol (0.84 equivalent) were freed from water in a 5 liter flask as in Example 1. Addition of 183 g of m-TMXDI (1.5 equivalent). In contrast to Example 1, the reaction was carried out over a period of 4.5 hours at a temperature of 150° C. Melt viscosity 27.5 Pa·s (175° C, Epprecht), spec. viscosity: 1.1. Viscosity (3% aqueous solution): 16,000 mPa·s.

B) Application of the Polyurethanes

I. Adhesive Properties of 40% Aqueous Solutions

The tensile shear strength of wood/wood bonds was tested in accordance with DIN 53283

| Example 1 | 6.8 N/mm² |
|---|---|
| Example 2 | 4.6 N/mm² |
| Example 3 | 2.8 N.mm² |
| Example 4 | 6.6 N/mm² |

II. Adhesive Properties as a Hotmelt Adhesive

The tensile shear strength of wood/wood bonds was tested in accordance with DIN 53283:

| Example 1 | 8.3 N/mm² |
|---|---|
| Example 2 | 5.3 N/mm² |
| Example 3 | 5.0 N/mm² |
| Example 4 | 7.8 N/mm² |
| Example 6 | 5.8 N/mm² |
| Example 7 | 7.5 N/mm² |
| Example 11b | 8.9 N/mm² |

III. Adhesive Properties of a Dilute Aqueous Solution (Wallpaper Adhesive)

A 5% solution (Example 7; viscosity: 25,000 mPa·s, Brookfield, spindle 7) was applied to paper which was then hung on gypsum plasterboard or gypsumplaster. After drying, such a firm bond was established between the paper and the substrate that the paper tore in peel tests.

IV. Use as a Protective Colloid a) Homopolymerization of vinyl acetate using the polyurethane of Example 1 and the emulsifier nonyl-phenol·10 EO.

In a reaction vessel equipped with a stirrer, thermometer, two dropwise addition ("dropping") vessels and a reflux condenser, 10 g of a reaction product of p-alkylphenol (containing 6 to 15 carbon atoms in the alkyl radical) and 6.5 to 30 moles of ethylene oxide, 2 g of sodium hydrogen carbonate and 100 g of a reaction product of polyethylene glycol and isocyanate were dissolved in 850 g of deionized water at temperatures of >80° C. A solution of 0.5 g of sodium formaldehyde sulfoxylate in 50 g of deionized water was added to the resulting solution at 80° C. 887 g of vinyl acetate monomer were placed in dropping vessel A while a mixture of 0.5 g of t-butyl hydroperoxide and 100 g of deionized water were placed in dropping vessel B. Continuous addition from the dropping vessels A and B was commenced at temperatures of 75 to 80° C. After the onset of polymerization, the continuous addition from vessels A and B was controlled in such a way that a reaction temperature of 80 to 85° C. was established. The reaction time was around 3.5 to 4 hours.

b) Copolymer dispersion using the polyurethane of Example 1 and the emulsifier nonylphenol ·10 EO In a reaction vessel of the type described in a), 40 g of a reaction product of p-alkylphenol (containing 6 to 15 carbon atoms in the alkyl radical) and 6.5 to 30 moles of ethylene oxide and 150 g of a reaction product of polyethylene glycol and isocyanate were dissolved in 849 g of deionized water at temperatures of >80° C. A solution of 1.5 g of sodium formaldehyde sulfoxylate in 50 g of deionized water was added to the resulting solution at 80° C. 539 g of vinyl acetate monomer and 270 g of maleic acid dibutyl ester were mixed and stored in dropping vessel A. A mixture of 0.5 g of t-butyl hydroperoxide and 100 g of deionized water was stored in dropping vessel B. Continuous addition from dropping vessels A and B was commenced at a temperature of 75 to 80° C. After the onset of polymerization, the continuous addition was controlled in such a way that a reaction temperature of 80 to 85° C. was established. The reaction time was around 3.5 to 4 hours.

Stable, coagulate-free dispersions with a particle size of 660 nm were obtained in both cases. The dispersions formed relatively soft, highly water-resistant films.

V. Use as a Thickener

The thickening effect of the polyurethanes according to the invention and their cooperation with salts and with nonionic surfactants is illustrated by the following Examples.

TABLE 1

Use of the polyurethanes according to the invention as thickeners:
Viscosity (Brookfield, 22° C.) in Pas as a function of the polymer concentration

| | Starting products for the PU | | | | Concentration of the PU in water | | | | |
|---|---|---|---|---|---|---|---|---|---|
| | Polyethylene | Hydrophobic | | Equivalent | in % by weight | | | | |
| Ex. No. | glycol | diol | Isocyanate | ratio | 5 | 4 | 3 | 2 | 1 |
| 1. | PEG 6000 | 1,12-C$_{12}$ diol | TMXDI | 1:2:3.1 | | | | | |
| a) | Without addition of NaCl | | | | Firm | 24000 | 5000 | 200 | 100 |
| b) | With 1% by weight of NaCl | | | | Firm | 17000 | | 200 | |
| c) | With 5% by weight of NaCl | | | | Firm | 13000 | | 200 | |
| d) | With 20% by weight of NaCl | | | | Firm | 100 | | | |
| e) | Without addition of NaCl | | | | Firm | 52000 | 11000 | 300 | 200 |
| 2. | PEG 6000 | 1,12-C$_{18}$-diol | TMXDI | 1:1.4:2.5 | Firm | 60000 | 14000 | 600 | 100 |
| 3. | PEG 6000 | Loxanol | TMXDI | 1:1.4:2.5 | Firm | | 16000 | 400 | 100 |
| 4. | PEG 6000 | Dimerdiol | TMXDI | 1:1.1:2.2 | Firm | | 4000 | | 100 |

TABLE 1-continued

Use of the polyurethanes according to the invention as thickeners:
Viscosity (Brookfield, 22° C.) in Pas as a function of the polymer concentration

| | Starting products for the PU | | | | Concentration of the PU in water | | | | |
|---|---|---|---|---|---|---|---|---|---|
| | Polyethylene | Hydrophobic | | Equivalent | in % by weight | | | | |
| Ex. No. | glycol | diol | Isocyanate | ratio | 5 | 4 | 3 | 2 | 1 |
| 5. | PEG 6000 | PPG 2000 | TMXDI | 0.5:0.5:1.02 | | | | | |
| a) | With 5% by weight of NaCl | | | | | 40000 (Even after 2 weeks) | | | |
| b) | With 25% by weight of NaCl | | | | | 2000 | | | |
| 6. | PEG 6000 | PTHF 2000 | TMXDI | 0.7:0.3:1.02 | | | | | |
| a) | With 5% by weight of NaCl | | | | | 43000 (35000 after 2 weeks) | | | |
| b) | With 20% by weight of NaCl | | | | | 26000 | | | |
| 7. | PEG 6000 | 1,12-C$_{12}$-diol | TMXDI | 1:2.5:2.6 | | | | | |
| a) | Without addition of surfactant as a 3% solution | | | | | | 800 | | |
| b) | With Dehydol LT7 in a ratio by weight of 7:3 (PU: Dehydol) as a 3% solution containing 2.1% by weight of PU | | | | | | 11000 | | |
| c) | With Dehydol LT7 in a ratio by weight of 6:4 (PU: Dehydol) as a 4% solution containing 2.4% by weight of PU | | | | | | 52000 | | |

Legend:
PPG: Polypropylene glycol
PTHF: Polytetrahydrofuran
Loxanol: Octadecane-1,12-diol, technical
Dehydol LT 7: reaction product of 1 mole of $C_{12-18}$ fatty alcohol with 7 moles of ethylene oxide
In contrast to Examples 1a) to 1d), Example 1e) was prepared over a period of 4 hours at 145° C.

What is claimed is:

1. A method for increasing viscosity of an aqueous system which comprises: admixing with the aqueous system a nonionic, water soluble, polyurethane having a weight average molecular weight of from 10.000 to 200,000 and consisting essentially of the groups;

(a) —O—(CH$_2$—CH$_2$O—)$_n$, wherein n is a number of 8–300;

(b) —CO—NH—X—NH—CO— wherein X is an aliphatic, aromatic or cycloaliphatic group; and (c) —O—Y—O—, wherein Y comprises a hydrophobic moiety selected from the group consisting of (—CH$_2$—CH(CH$_3$)—O)$_m$—CH$_2$—CH(CH$_3$)—, (CH$_2$—CH(C$_2$H$_5$)—O)$_m$—CH$_2$—CH(C$_2$H$_5$)—, (CH$_2$—CH$_2$—CH$_2$—CH$_2$ O)$_m$—CH$_2$—CH$_2$—CH$_2$—CH$_2$—,
alkylene groups having from 6 to 44 carbon atoms, cycloalkylene groups having from 6 to 44 carbon atoms and mixtures thereof wherein m is a number of 8 to 500, the nonionic polyurethane forms a homogenous mixture with water; the mixture having a specific viscosity of at least 0.4 at a 1% by weight solution in water at 20° C. wherein (c) comprises from 5% to 40% by weight, based on (a)+(c) of the polyurethane.

2. The method of claim 1 wherein (c) comprises from 5% to 25% by weight based on (a)+(C) of the polyurethane.

3. The method of claim 1 wherein the nonionic polyurethane is soluble in water at any mixing ratio at 20° C.

4. The method of claim 1 wherein the nonionic polyurethane is present as a solution in water up to 70% by weight of nonionic polyurethane, based on the weight of the solution.

5. The method of claim 1 wherein the nonionic polyurethane has a specific viscosity of 0.5 to 6.0 at 1% by weight in an aqueous solution at 20° C.

6. The method of claim 1 wherein the nonionic polyurethane has a melt viscosity at 175° C. of more than 3 Pas.

7. The method of claim 1 wherein n is 20 to 300 and m is 20 to 300.

8. The method of claim 1 wherein the moiety comprises residues of a diol having a solubility in water not greater than 2 grams/100 grams of water.

9. The method of claim 1 wherein the nonionic polyurethane is admixed as an aqueous solution containing from 1% to 40% of the nonionic polyurethane.

10. The method of claim 1 wherein the nonionic polyurethane has a weight average molecular weight of from 40,000 to 180,000.

11. The method of claim 1 wherein the nonionic polyurethane is formed from a mixture wherein a molar ratio of diol to diisocyanate is in a range of 1:0.95 to 1:1.25.

12. The method of claim 1 wherein the nonionic polyurethane is formed from a mixture wherein a molar ratio of diol to diisocyanate is in a range of 1:95 to 1:1.12.

13. The method of claim 1 wherein the nonionic polyurethane is formed from a mixture wherein a molar ratio of diol to diisocyanate is in a range of 1.0:0.98 to 1:1.1.

14. The method of claim 1 wherein the (b) group of the nonionic polyurethane comprises residue of m-tetramethyl xylylene diisocyanate.

15. The method of claim 1 wherein the nonionic polyurethane has been chain extended.

16. The method of claim 1 wherein a nonionic surfactant is admixed with the aqueous system.

17. The method of claim 16 wherein the nonionic polyurethane is admixed with the aqueous system in an amount of 1% to 5% based on the weight of the aqueous system with increased viscosity.

18. The method of claim 1 wherein at least 1% by weight of the nonionic polyurethane is admixed with the aqueous system.

19. The method of claim 16 wherein the aqueous system contains an electrolyte.

20. The method of claim 1 wherein the aqueous system contains an electrolyte.

21. The method of claim 1 wherein the aqueous system is additionally admixed with at least one nonionic surfactant selected from the group consisting of partial esters of polyalcohols, ethylene oxide adducts, propylene oxide adducts, amides of higher fatty acids, lecithins, and steroids.

22. The method of claim 1 wherein the aqueous system is additionally admixed with at least one nonionic surfactant selected from the group consisting of fatty alcohol polyglycol ethers, alkylphenol polyglycol ethers, fatty acid polyglycol ethers, fatty acid amide polyglycol ethers, fatty amine polyglycol ethers, alkoxylated triglycerides, alk(en)yl oligoglycosides, fatty acid glucamides, polyol fatty acid esters, sugar esters, sorbitan esters, and polysorbates.

23. The method as claimed in claim 1 wherein the polyurethane has a degree of crystallization of 20% to 80%, based on the degree of crystallization of polyethylene glycol.

* * * * *

UNITED STATES PATENT AND TRADEMARK OFFICE
CERTIFICATE OF CORRECTION

PATENT NO. : 6,943,230 B2
DATED : September 13, 2005
INVENTOR(S) : Fischer et al.

It is certified that error appears in the above-identified patent and that said Letters Patent is hereby corrected as shown below:

Title page,
Item [62], Related U.S. Application Data, delete "division of" and insert
-- 371 of --.

Column 14,
Line 43, delete "1:95" and insert -- 1:0.95 --.

Signed and Sealed this

Ninth Day of May, 2006

JON W. DUDAS
*Director of the United States Patent and Trademark Office*